United States Patent
Horng et al.

(10) Patent No.: US 10,718,343 B2
(45) Date of Patent: Jul. 21, 2020

(54) CEILING FAN MOTOR WITH AXLE AND A SLEEVE WITH CABLE GROOVE AND A SHOULDER, THE SLEEVE WRAPPED AROUND THE AXLE, BEARINGS AROUND THE SLEEVE AND ROTOR/STATOR COUPLING PORTIONS

(71) Applicant: Sunonwealth Electric Machine Industry Co., Ltd., Kaohsiung (TW)

(72) Inventors: Alex Horng, Kaohsiung (TW); Tso-Kuo Yin, Kaohsiung (TW); Kun-Ta Yang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 205 days.

(21) Appl. No.: 15/865,347

(22) Filed: Jan. 9, 2018

(65) Prior Publication Data
US 2018/0274546 A1    Sep. 27, 2018

(30) Foreign Application Priority Data

Mar. 23, 2017    (TW) .............................. 106109814 A (51) Int. Cl.
*H02K 1/30*     (2006.01)
*F04D 25/06*    (2006.01)
(Continued)

(52) U.S. Cl.
CPC ......... *F04D 25/062* (2013.01); *F04D 25/064* (2013.01); *F04D 25/0646* (2013.01);
(Continued)

(58) Field of Classification Search
CPC .. H02K 5/01; H02K 5/06; H02K 5/15; H02K 5/173; H02K 5/1735; H02K 5/1737;
(Continued)

(56) References Cited

U.S. PATENT DOCUMENTS 4,128,280 A * 12/1978 Purtschert ............... F16C 17/03
                                                           310/90.5
5,938,343 A *  8/1999 Grantz .................. F16C 17/026
                                                           384/100
(Continued)

FOREIGN PATENT DOCUMENTS

CN        102710084 A    10/2012
CN        104753294 A     7/2015
(Continued)

*Primary Examiner* — Maged M Almawri
(74) *Attorney, Agent, or Firm* — Alan D. Kamrath; Karin L. Williams; Mayer & Williams PC (57) ABSTRACT

A ceiling fan motor includes a sleeve, a stator unit fixed around the sleeve, a rotor unit rotatably mounted around the sleeve, and an axle detachably mounted to the sleeve. The axle can include an extending section and a suspension section. The extending section extends through and is coupled to the sleeve. The suspension section is exposed outside of the sleeve. The extending section can be contiguous to the suspension section. An outer diameter of the axle at the extending section can be smaller than an outer diameter at the suspension section to form a shoulder. An end of the sleeve can abut the shoulder.

12 Claims, 5 Drawing Sheets

(51) Int. Cl.
  *H02K 1/28* (2006.01)
  *H02K 5/173* (2006.01)
  *H02K 1/27* (2006.01)
  *F04D 25/08* (2006.01)
  *F04D 29/60* (2006.01)
  *H02K 1/18* (2006.01)
  *H02K 21/22* (2006.01)

(52) U.S. Cl.
  CPC ......... *F04D 25/088* (2013.01); *F04D 29/601* (2013.01); *H02K 1/187* (2013.01); *H02K 1/2786* (2013.01); *H02K 1/28* (2013.01); *H02K 5/1737* (2013.01); *H02K 21/22* (2013.01); *H02K 1/30* (2013.01); *H02K 2213/03* (2013.01)

(58) Field of Classification Search
  CPC ...... H02K 5/24; H02K 5/16; H02K 5/161; H02K 5/18; H02K 7/14; H02K 7/06; H02K 7/08; H02K 7/081; H02K 7/085; H02K 7/086; H02K 7/088; H02K 7/10; H02K 7/116; H02K 7/1166; H02K 7/1815; H02K 11/33; H02K 2005/1287; H02K 2213/03; H02K 1/27; H02K 1/28; H02K 1/30; H02K 1/2786; H02K 1/187; H02K 21/22; B60T 13/741; B60T 13/745; F04D 25/062; F04D 25/088; F04D 25/0646; F04D 25/064
  USPC ... 310/99, 98, 83, 90, 90.5, 91, 68 B, 12.31, 310/425, 89; 188/72.1–72.8
  See application file for complete search history.

(56) References Cited

U.S. PATENT DOCUMENTS

| | | | | |
|---|---|---|---|---|
| 5,982,061 | A * | 11/1999 | Grantz | H02K 5/1737 310/67 R |
| 8,836,183 | B2 * | 9/2014 | Nishino | G11B 19/2009 310/67 R |
| 9,712,003 | B2 * | 7/2017 | Yin | H02K 1/187 |
| 10,205,356 | B2 * | 2/2019 | Horng | H02K 5/08 |
| 2002/0089245 | A1 * | 7/2002 | Chen | F16C 17/026 310/67 R |
| 2002/0175029 | A1 * | 11/2002 | Saruwatari | F16D 55/228 188/72.1 |
| 2003/0201683 | A1 * | 10/2003 | Chen | F16C 33/107 310/90 |
| 2004/0160142 | A1 * | 8/2004 | Marioni | F04D 29/426 310/91 |
| 2004/0189122 | A1 * | 9/2004 | Obata | F16C 17/10 310/90 |
| 2005/0040776 | A1 * | 2/2005 | Sibley | F16F 15/3153 318/150 |
| 2007/0228859 | A1 * | 10/2007 | Rao | H02K 1/12 310/156.37 |
| 2008/0029212 | A1 * | 2/2008 | Tamaoka | B21J 5/12 156/275.5 |
| 2009/0146515 | A1 * | 6/2009 | Popov | F16C 17/02 310/90.5 |
| 2012/0032542 | A1 * | 2/2012 | Liu | F04D 25/0613 310/88 |
| 2013/0285495 | A1 * | 10/2013 | Horng | H02K 3/522 310/90 |
| 2014/0300233 | A1 * | 10/2014 | Arimatsu | H02K 1/278 310/156.12 |
| 2014/0354098 | A1 * | 12/2014 | Krebs | F16C 33/06 310/90.5 |
| 2016/0065009 | A1 * | 3/2016 | Horng | H02K 5/08 310/90 |
| 2017/0167495 | A1 * | 6/2017 | Santolucito | F04D 25/088 |
| 2017/0268524 | A1 * | 9/2017 | Kanai | H02P 29/00 |
| 2017/0366055 | A1 * | 12/2017 | Arimatsu | H02K 1/274 |
| 2017/0373548 | A1 * | 12/2017 | Arimatsu | H02K 1/27 |
| 2019/0312475 | A1 * | 10/2019 | Seidl | H02K 1/26 |

FOREIGN PATENT DOCUMENTS

| | | |
|---|---|---|
| TW | M354002 U | 4/2009 |
| TW | M401969 U | 4/2011 |

* cited by examiner

CEILING FAN MOTOR WITH AXLE AND A SLEEVE WITH CABLE GROOVE AND A SHOULDER, THE SLEEVE WRAPPED AROUND THE AXLE, BEARINGS AROUND THE SLEEVE AND ROTOR/STATOR COUPLING PORTIONS

CROSS REFERENCE TO RELATED APPLICATIONS

The application claims the benefit of Taiwan application serial No. 106109814, filed on Mar. 23, 2017, and the entire contents of which are incorporated herein by reference.

BACKGROUND OF THE INVENTION

1. Field of the Invention

The present invention relates to a motor and, more particularly, to a motor used in a ceiling fan.

2. Description of the Related Art

Figure 1:
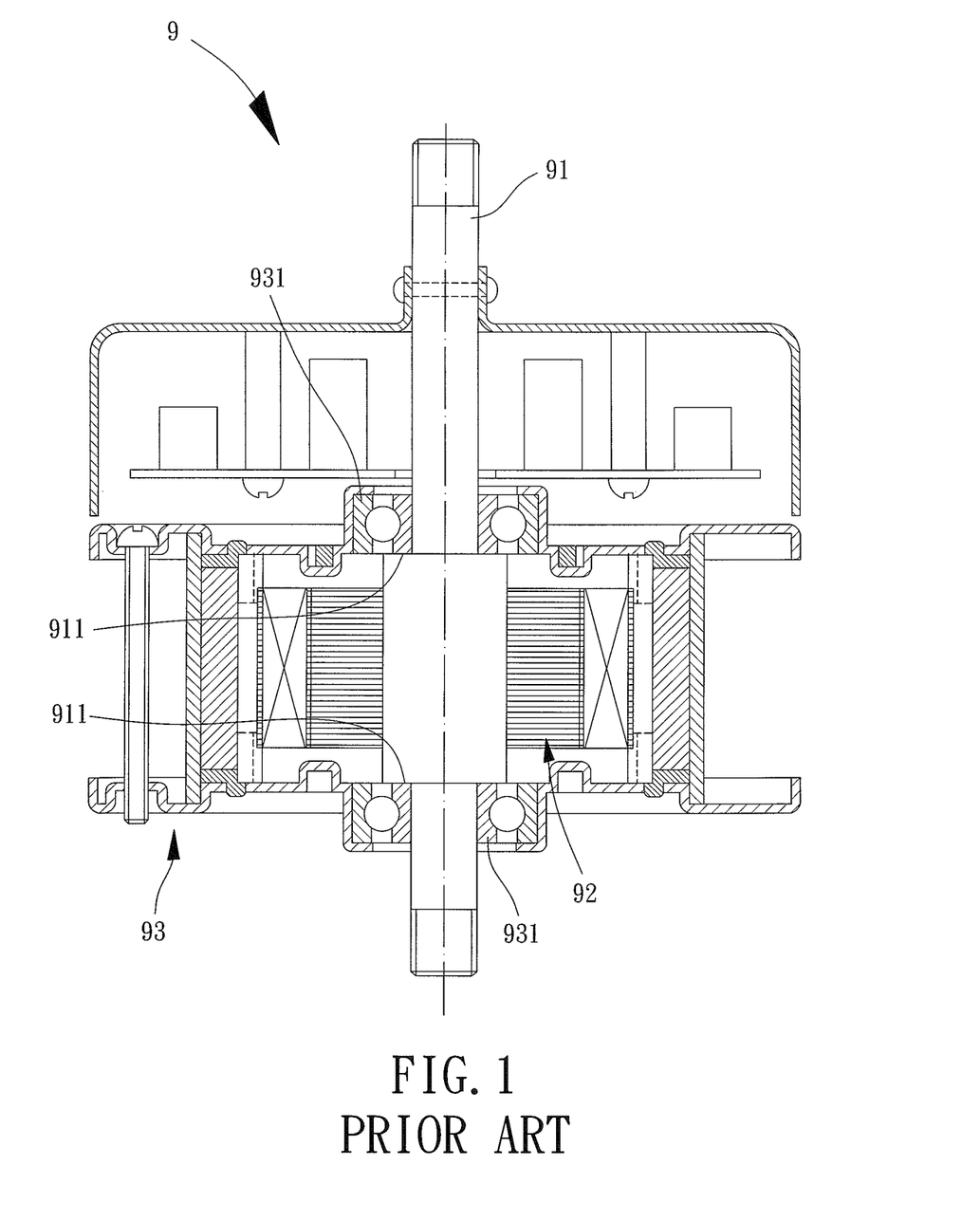
FIG. 1 is a cross sectional view of a conventional ceiling fan motor.

FIG. 1 shows a conventional ceiling fan motor 9 including an axle 91, a stator unit 92, and a rotor unit 93. The ceiling fan motor 9 is fixed to a ceiling by the axle 91. The stator unit 92 is fixed around the axle 91. The axle 91 includes two shoulders 911 for abutting and positioning two bearings 931 of the rotor unit 93, permitting the rotor unit 93 to be rotatably mounted around the axle 91. An example of such a ceiling fan motor 9 is disclosed in Taiwan Utility Model M354002 entitled "CEILING FAN MOTOR."

In on-site installation, a plurality of blades (not shown) is mounted on an outer periphery of the rotor unit 93 of the ceiling fan motor 9 to rotate together with the rotor unit 93 for driving the air. In packaging, to avoid a bulky package that is not convenient for transportation, the ceiling fan motor 9 and the blades are generally separate from each other and are stacked for boxing to reduce the overall packaging volume.

However, the axle 91 is needed in the ceiling fan motor 9 as a basis for positioning the stator unit 92 and the rotor unit 93 during installation and, thus, cannot be detached from the stator unit 92 and the rotor unit 93 when the ceiling fan motor 9 is being packaged. Furthermore, the axle 91 suspended to the ceiling has a certain length, leading to difficulties in reduction of the axial height of the whole ceiling fan motor 9. The reduction of the overall packaging volume is limited even though the ceiling fan motor 9 is separate from the blades.

Thus, improvement to conventional ceiling fan motors is necessary.

SUMMARY OF THE INVENTION

To solve the above problems, the present invention provides a ceiling fan motor including a stator unit and rotor unit. The stator unit and the rotor unit do not have to rely on the axle for assembly and positioning. In packaging, the axle can be separate from the stator unit and the rotor unit to significantly reduce the packaging volume of the ceiling fan motor, increasing convenience for transportation and inventory management.

When the terms "front", "rear", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

A ceiling fan motor according to the present invention includes a sleeve, a stator unit fixed around the sleeve, a rotor unit rotatably mounted around the sleeve, and an axle detachably mounted to the sleeve.

Due to provision of the sleeve, the stator unit and the rotor unit of the ceiling fan motor according to the present invention do not have to rely on the axle for assembly and positioning. In packaging, the axle can be separate from the stator unit and the rotor unit to significantly reduce the packaging volume of the ceiling fan motor, increasing convenience for transportation and inventory management.

In an example, the axle includes an extending section and a suspension section. The extending section extends through and is coupled to the sleeve. The suspension section is exposed outside of the sleeve. This structure increases the assembling convenience.

In an example, the extending section is contiguous to the suspension section. An outer diameter of the axle at the extending section is smaller than an outer diameter at the suspension section to form a shoulder. The sleeve has an end abutting the shoulder. This structure limits the coupling depth of the axle and the sleeve. Thus, after coupling, the axle and the sleeve are retained in a position permitting convenient mutual interlocking and positioning, increasing the assembling convenience.

In an example, the sleeve includes an inner periphery and an outer periphery. The outer periphery includes a stator coupling portion and a rotor coupling portion. The stator unit is fixed to the stator coupling portion. The rotor unit is rotatably mounted to the rotor coupling portion. This structure increases the assembling convenience.

In an example, the rotor coupling portion includes two engaging portions. The stator coupling portion is located between the two engaging portions. This structure increases the assembling convenience.

In an example, the rotor unit includes two ball bearings and a housing. Each of the two ball bearings includes an inner race and an outer race. The inner race of each of the two ball bearings is mounted to a respective one of the two engaging portions. The housing is coupled to the outer races of the two ball bearings. The stator unit is enclosed in the housing. A magnetic member is mounted to the housing and is aligned with the stator unit for magnetic induction. This structure increases the assembling convenience.

In an example, the housing includes an annular wall. The magnetic member is mounted to the annular wall. The annular wall has an axial height along a longitudinal axis of the sleeve. The sleeve has an axial length along the longitudinal axis larger than the axial height of the annular wall. Thus, the operational convenience for assembling and positioning of the stator unit and he rotor unit on the sleeve.

In an example, an axial plane passes through the longitudinal axis of the sleeve. A projection of the annular wall onto the axial plane is located within a projection of the sleeve onto the axial plane. This structure increases the assembling convenience.

In an example, the two ball bearings are located within the projection of the annular wall onto the axial plane. This structure reduces the space required for installation of the stator unit and the rotor unit on the sleeve and increases the assembling convenience.

In an example, the housing further includes a mounting plate. The rotor unit further includes a pressing disc pressing against and coupled to a portion of the mounting plate adjacent to the outer race of one of the two ball bearings. This structure assures tight pressing between the housing and the outer race of the corresponding ball bearing and increases the rotational smoothness of the rotor unit relative to the axle.

In an example, the ceiling fan motor further includes a buffering member mounted around the sleeve. The buffering member is located between one of the two engaging portions of the sleeve and the inner race of one of the two ball bearings. This structure provides preset biasing for the inner race of the ball bearing by the buffering member to increase the rotational smoothness of the rotor unit relative to the axle.

In an example, the buffering member is press fit around the outer periphery of the sleeve to increase the engaging reliability between the buffering member and the sleeve.

In an example, the ceiling fan motor further includes a restraining cover located between the buffering member and one of the two engaging portions of the sleeve. The buffering member abuts the restraining cover. The restraining cover includes a sidewall facing an outer periphery of the buffering member. This structure restrains the expansion in the diametric direction of the buffering member, avoiding the buffering member from contacting the outer race of the corresponding ball bearing and thereby avoiding adverse influence on the rotational smoothness.

In an example, the sleeve includes a wire extending portion extending from the inner periphery through the outer periphery of the sleeve. This structure increases the assembling convenience.

In an example, the wire extending portion includes a groove extending from the inner periphery through the outer periphery of the sleeve. This structure is simple and easy to manufacture.

In an example, the wire extending portion includes a groove and two through-holes spaced from each other. The groove is defined in the inner periphery of the sleeve and does not extend to the outer periphery of the sleeve. Each of the two through-holes extends from the outer periphery of the sleeve to the groove. In this structure, this portion of the sleeve permits extension of the wires of the stator unit and provides assembly and positioning of the rotor unit, increasing the space utilization, which is helpful in reduction of the axial length of the sleeve.

The present invention will become clearer in light of the following detailed description of illustrative embodiments of this invention described in connection with the drawings.

DETAILED DESCRIPTION OF THE INVENTION

Figure 2:
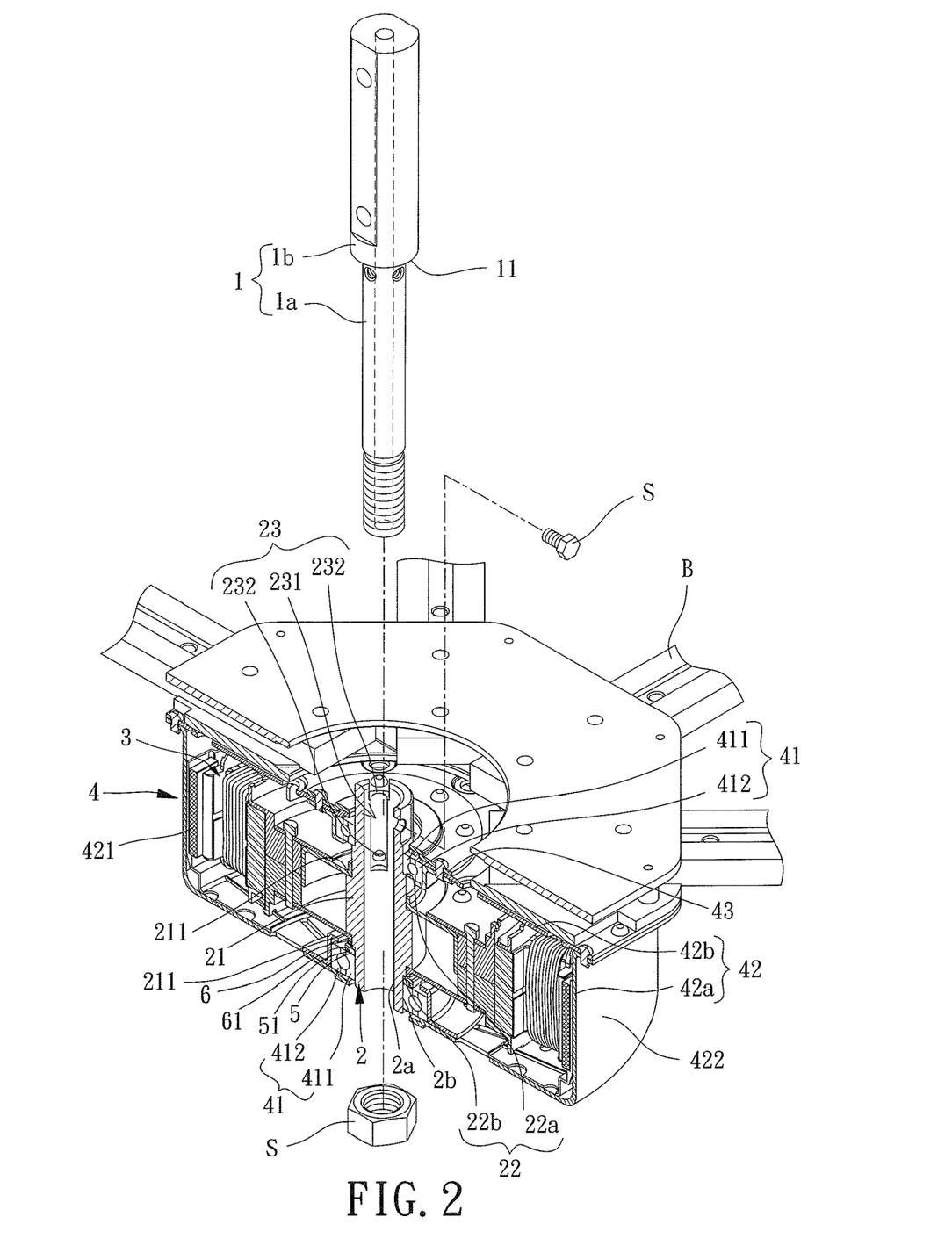
FIG. 2 is an exploded, partly-cutaway, perspective view of a ceiling fan motor of an embodiment according to the present invention.

With reference to FIG. 2, a ceiling fan motor of an embodiment according to the present invention includes an axle 1, a sleeve 2, a stator unit 3, and a rotor unit 4. The stator unit 3 and the rotor unit 4 are mounted to the sleeve 2. The axle 1 is detachably mounted to the sleeve 2.

Figure 3:
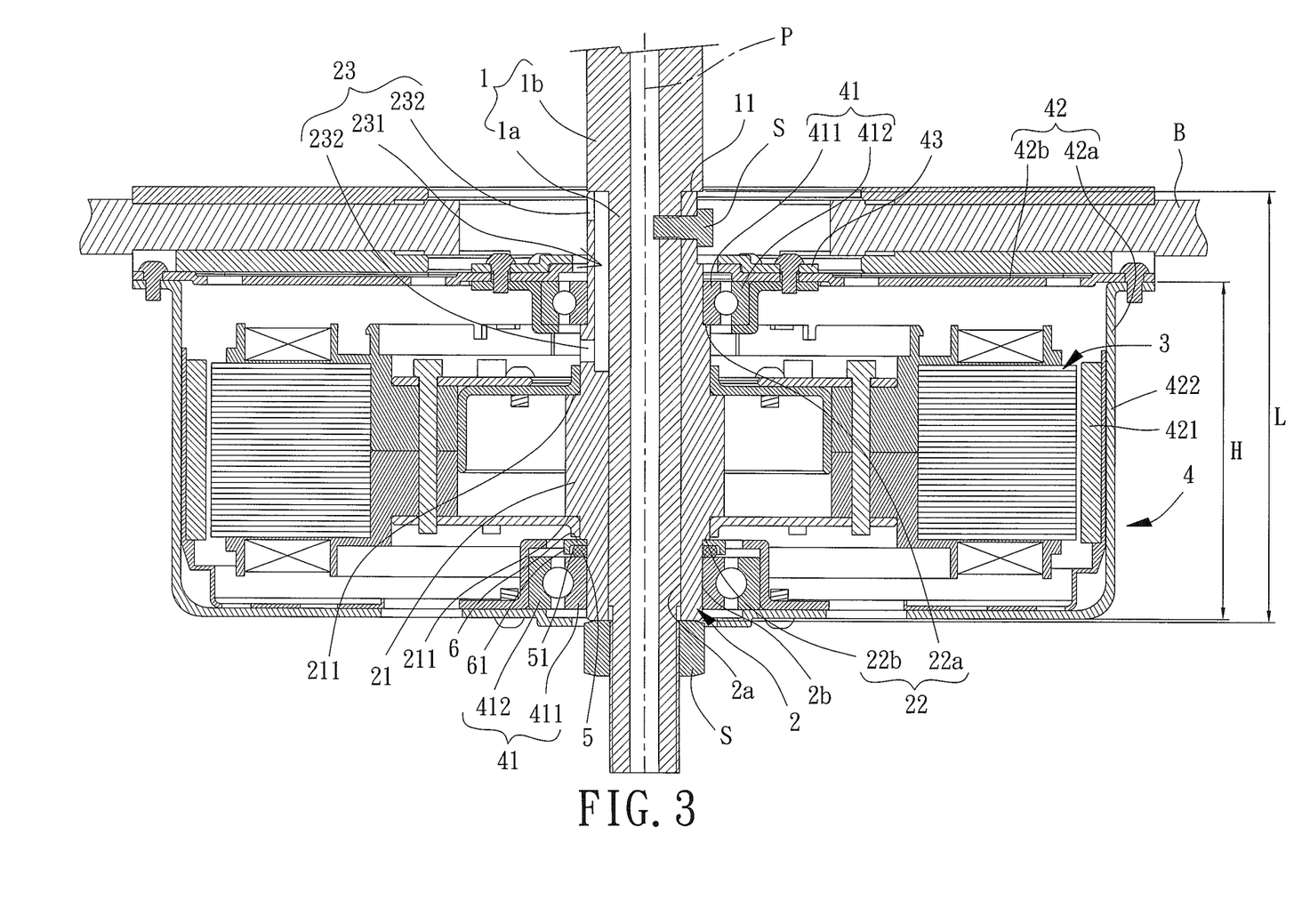
FIG. 3 is a cross sectional view of the ceiling fan motor of FIG. 2.

With reference to FIGS. 2 and 3, the axle 1 includes an extending section 1a and a suspension section 1b. The extending section 1a extends through and is coupled to the sleeve 2 to couple the axle 1 to the sleeve 2. The suspension section 1b is exposed outside of and located above the sleeve 2 and can be fixed to a ceiling or the like. In this embodiment, the extending section 1a is contiguous to the suspension section 1b. Furthermore, an outer diameter of the axle 1 at the extending section 1a is smaller than an outer diameter at the suspension section 1b to form a shoulder 11 by the diameter difference. The sleeve 2 has an end abutting the shoulder 11 to limit the coupling depth of the axle 1 and the sleeve 2. Thus, after coupling, the axle 1 and the sleeve 2 are retained in a position permitting convenient mutual interlocking and positioning, increasing the assembling convenience.

Figure 4:
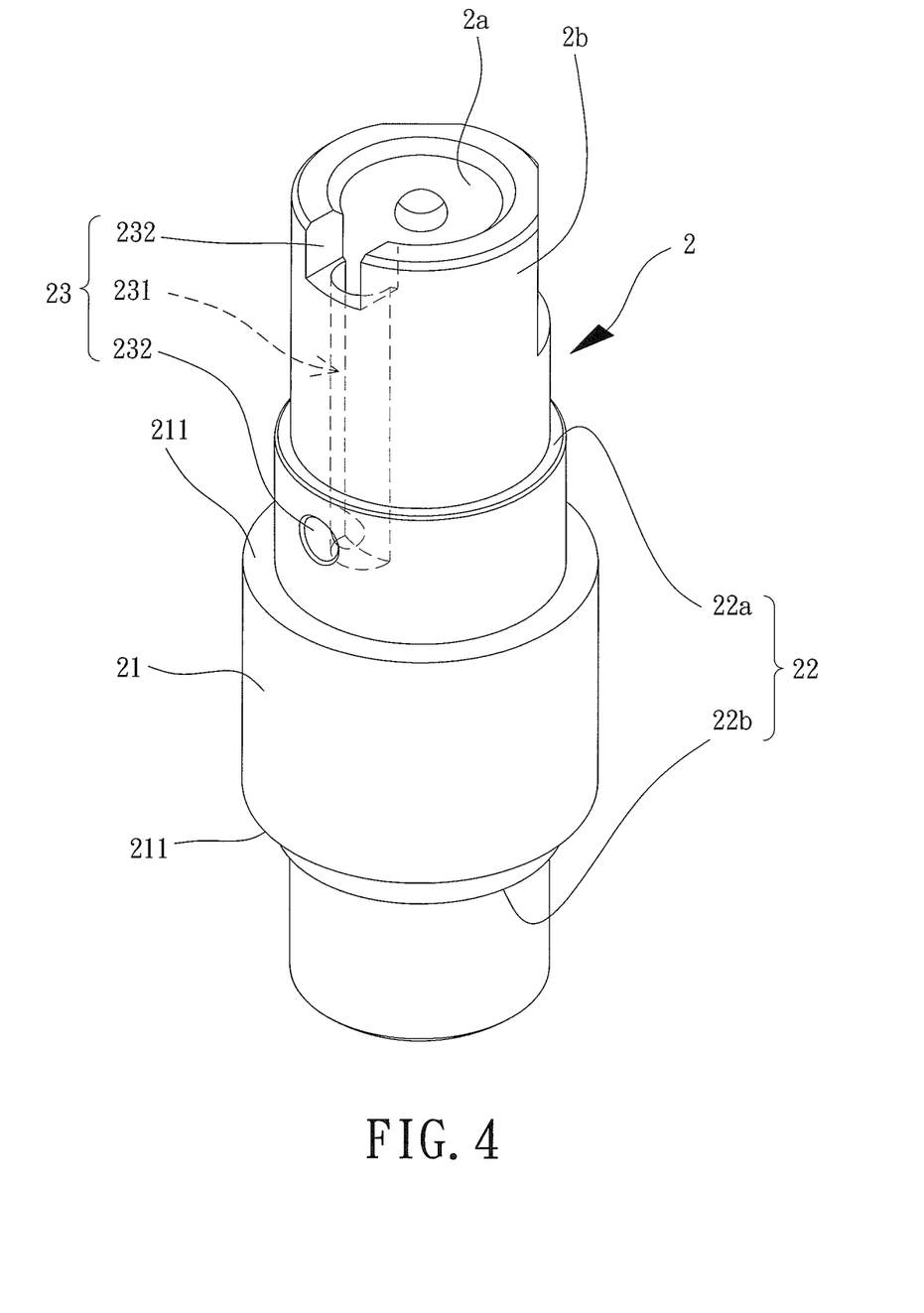
FIG. 4 is a perspective view of a sleeve of the ceiling fan motor of FIG. 2.

With reference to FIGS. 3 and 4, the extending section 1a of the axle 1 extends through the sleeve 2. At least one fastener S is used to securely fix the sleeve 2 to the outer periphery of the extending section 1a of the axle 1. When the at least one fastener S is removed, the axle 1 can be drawn out of the sleeve 2. The number and type of the fastener S are not limited in the present invention as long as secure locking between the sleeve 2 and the axle 1 can be achieved.

The sleeve 2 includes an inner periphery 2a and an outer periphery 2b. The outer periphery 2b includes a stator coupling portion 21 and a rotor coupling portion 22 for installation and positioning of the stator unit 3 and the rotor unit 4, respectively. The sleeve 2 further includes a wire extending portion 23 extending from the inner periphery 2a through the outer periphery 2b of the sleeve 2 for disposition of wires (not shown) for the stator unit 3.

In this embodiment, the stator coupling portion 21 is an annular protrusion protruding from the outer periphery 2b of the sleeve 2. A positioning portion 211 is formed on each of two ends of the stator coupling portion 21 for positioning and assembly of the stator unit 3. The rotor coupling portion 22 includes two engaging portions 22a and 22b. The stator coupling portion 21 is located between the two engaging portions 22a, 22b. The engaging portions 22a and 22b provide rotatable coupling with the rotor unit 4, such that the stator unit 3 can drive the rotor unit 4 to rotate.

The wire extending portion 23 includes a groove 231 through which the wires of the stator unit 3 extend. The groove 231 is defined in the inner periphery 2a of the sleeve 2. The groove 231 can extend or not extend to the outer periphery 2b of the sleeve 2. Preferably, the groove 231 does not extend to the outer periphery 2b of the sleeve 2. Furthermore, two through-holes 232 spaced from each other are provided. Each of the two through-holes 232 extends from the outer periphery 2b of the sleeve 2 to the groove 231. Thus, the wires of the stator unit 3 extend from the outer periphery 2b into one of the two through-holes 232, pass through the groove 231, and then extend through the other through-hole 232 out of the outer periphery 2b for electrical connection with a circuit of an electric box. Thus, a portion of the sleeve 2 between the two through-holes 232 can assist in positioning of the wires, reducing jamming or breakage resulting from inadvertent pulling of the wires during assembly. Furthermore, one of the engaging portions 22a and 22b (engaging portion 22a in this embodiment) of the rotor coupling portion 22 is disposed between the two through-holes 232. Thus, this portion of the sleeve 2 permits extension of the wires of the stator unit 3 and provides assembly and positioning of the rotor unit 4, increasing the space utilization, which is helpful in reduction of the axial length of the sleeve 2.

Figure 5:
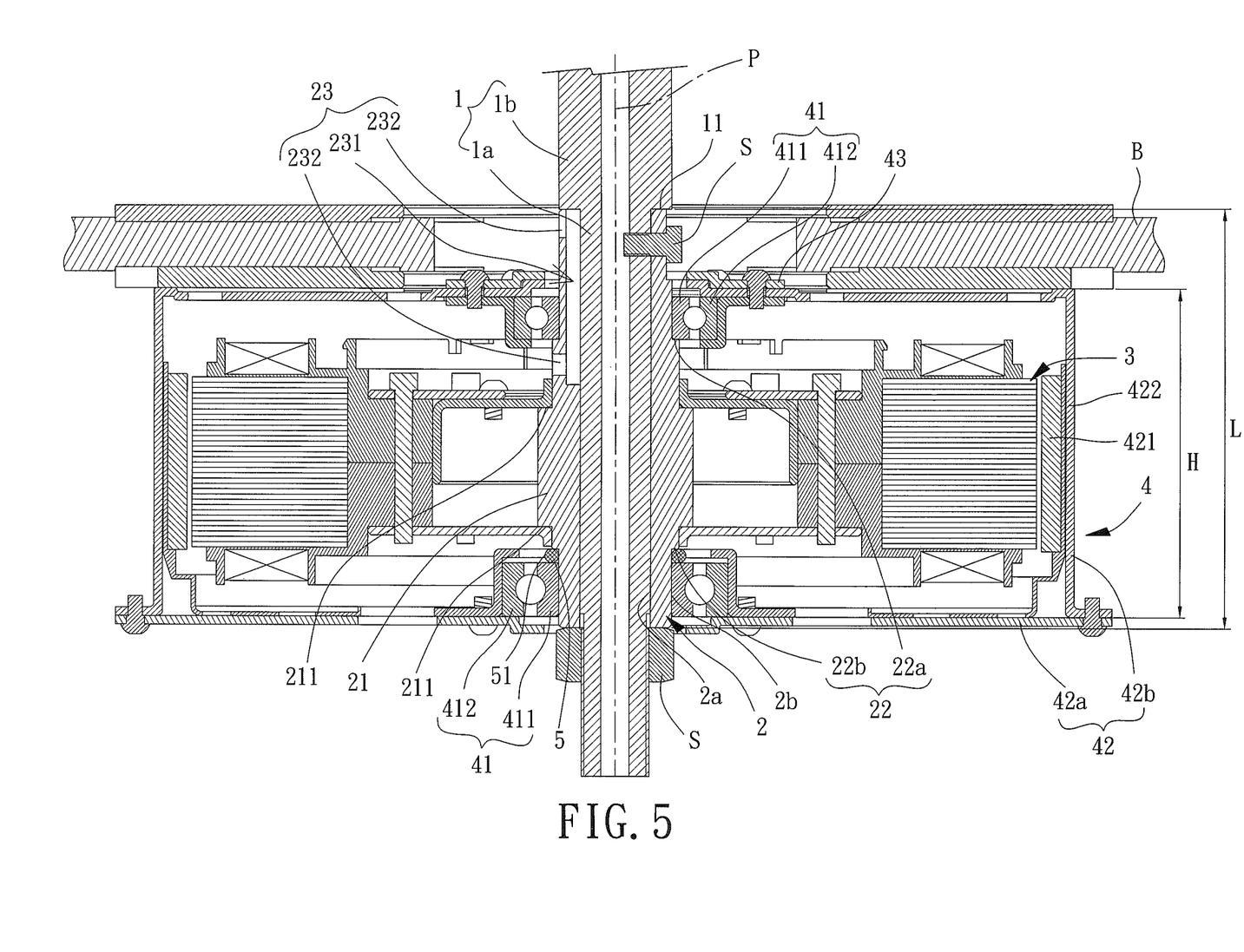
FIG. 5 is a cross sectional view of a ceiling fan motor of another embodiment according to the present invention.

With reference to FIGS. 2 and 3, the stator unit 3 is fixed to the stator coupling portion 21 on the outer periphery 2b of the sleeve 2. The rotor unit 4 is rotatably mounted to the rotor coupling portion 22 on the outer periphery 2b of the sleeve 2. In this embodiment, the rotor unit 4 includes two ball bearings 41 and a housing 42. Each of the two ball bearings 41 includes an inner race 411 and an outer race 412. The inner race 411 of each of the two ball bearings 41 is mounted to one of the two engaging portions 22a and 22b. The housing 42 is coupled to the outer races 412 of the two ball bearings 41, such that the housing 42 can rotate jointly with the outer races 412 of the two ball bearings 41 relative to the inner races 411. The stator unit 3 is enclosed in the housing 42. A magnetic member 421 is mounted to the housing 42 and is aligned with the stator unit 3 for magnetic induction, permitting the stator unit 3 to drive the rotor unit 4 to rotate. In this embodiment, the housing 42 includes a casing 42a and a mounting plate 42b detachably coupled to the casing 42a to increase assembling convenience. Blades B of a ceiling fan can be directly or indirectly coupled to the mounting plate 42b. The casing 42a and the mounting plate 42b are not limited in types. In an example shown in FIG. 3, the mounting plate 42b is a plate, and the casing 42a is cylindrical. In an alternative example shown in FIG. 5, the mounting plate 42b is cylindrical, and the casing 42a is a plate.

Furthermore, the housing 42 includes an annular wall 422 for mounting the magnetic member 421. The annular wall 422 has an axial height H along a longitudinal axis of the sleeve 2. The sleeve 2 has an axial length L along the longitudinal axis larger than the axial height H of the annular wall 422. An axial plane P passes through the longitudinal axis of the sleeve 2. A projection of the annular wall 422 onto the axial plane P is located within a projection of the sleeve 2 onto the axial plane P. Furthermore, the two ball bearings 41 are located within the projection of the annular wall 422 onto the axial plane P. Thus, the space required for installation of the stator unit 3 and the rotor unit 4 along the longitudinal axis of the sleeve 2 can be reduced while increasing operational convenience for assembling and positioning of the stator unit 3 and the rotor unit 4 on the sleeve 2.

The rotor unit 4 can further include a pressing disc 43 pressing against and coupled to a portion of the mounting plate 42b adjacent to the outer race 412 of one of the two ball bearings 41 to assure tight pressing between the housing 42 and the outer race 412 of the corresponding ball bearing 41. The ceiling fan motor can further include a buffering member 5 mounted around the sleeve 2 (preferably by press fitting). The buffering member 5 is located between one of the two engaging portions 22a and 22b (engaging portion 22b in this embodiment) of the sleeve 2 and the inner race 411 of one of the two ball bearings 41. Thus, the buffering member 5 provides preset biasing for the inner race 411 of the corresponding ball bearing 41. As a result, the ceiling fan motor can increase the rotational smoothness of the rotor unit 4 relative to the axle 1 by the pressing disc 43 and the buffering member 5. Furthermore, a restraining cover 6 is mounted between the buffering member 5 and one of the two engaging portions 22a and 22b (engaging portion 22b in this embodiment) of the sleeve 2. The buffering member 5 abuts the restraining cover 6. The restraining cover 6 includes a sidewall 61 facing an outer periphery 51 of the buffering member 5. Thus, when the buffering member 5 is subject to a larger squeezing force and, thus, expands in a diametric direction, the sidewall 61 of the restraining cover 6 provides a stop for the outer periphery 51 of the buffering member 5 to restrain the expansion in the diametric direction of the buffering member 5, avoiding the buffering member 5 from contacting the outer race 412 of the corresponding ball bearing 41 and thereby avoiding adverse influence on the rotational smoothness.

In view of the above structure, the ceiling fan motor according to the present invention permits the stator unit 3 and the rotor unit 4 to be assembled to and positioned on the sleeve 2 beforehand. In on-site installation, the sleeve 2 is securely coupled with the axle 1. Thus, in packaging of the ceiling fan motor, the axle 1 can be detached from the sleeve 2 and can be placed in a radial direction of the sleeve 2 to significantly reduce the axial height of the ceiling fan motor that occupies a packaging space.

In view of the foregoing, due to provision of the sleeve 2, the stator unit 3 and the rotor unit 4 of the ceiling fan motor according to the present invention do not have to rely on the axle 1 for assembly and positioning. In packaging, the axle 1 can be separate from the stator unit 3 and the rotor unit 4 to significantly reduce the packaging volume of the ceiling fan motor, increasing convenience for transportation and inventory management.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A ceiling fan motor comprising:
a sleeve;
a stator unit fixed around the sleeve;
a rotor unit rotatably mounted around the sleeve; and
an axle detachably mounted to the sleeve,
wherein the sleeve includes an inner periphery and an outer periphery, wherein the outer periphery includes a stator coupling portion and a rotor coupling portion, wherein the stator unit is fixed to the stator coupling portion, wherein the rotor unit is rotatably mounted to the rotor coupling portion,
wherein the rotor coupling portion includes two engaging portions, wherein the stator coupling portion is located between the two engaging portions,
wherein the rotor unit includes two ball bearings and a housing, wherein each of the two ball bearings includes an inner race and an outer race, wherein the inner race of each of the two ball bearings is mounted to a respective one of the two engaging portions, wherein the housing is coupled to the outer races of the two ball bearings, wherein the stator unit is enclosed in the housing, and wherein a magnetic member is mounted to the housing and is aligned with the stator unit for magnetic induction,
wherein the housing further includes a mounting plate, and wherein the rotor unit further includes a pressing disc pressing against and coupled to a portion of the mounting plate adjacent to the outer race of one of the two ball bearings.

2. The ceiling fan motor as claimed in claim 1, wherein the axle includes an extending section and a suspension section, wherein the extending section extends through and is coupled to the sleeve, and wherein the suspension section is exposed outside of the sleeve.

3. The ceiling fan motor as claimed in claim 2, wherein the extending section is contiguous to the suspension section, wherein an outer diameter of the axle at the extending section is smaller than an outer diameter at the suspension section to form a shoulder, and wherein the sleeve has an end abutting the shoulder.

4. The ceiling fan motor as claimed in claim 1, wherein the sleeve includes a wire extending portion extending from the inner periphery through the outer periphery of the sleeve.

5. The ceiling fan motor as claimed in claim 4, wherein the wire extending portion includes a groove extending from the inner periphery through the outer periphery of the sleeve.

6. A ceiling fan motor comprising:
a sleeve;
a stator unit fixed around the sleeve;
a rotor unit rotatably mounted around the sleeve;
an axle detachably mounted to the sleeve; and
a buffering member mounted around the sleeve,
wherein the sleeve includes an inner periphery and an outer periphery, wherein the outer periphery includes a stator coupling portion and a rotor coupling portion, wherein the stator unit is fixed to the stator coupling portion, wherein the rotor unit is rotatably mounted to the rotor coupling portion,
wherein the rotor coupling portion includes two engaging portions, wherein the stator coupling portion is located between the two engaging portions,
wherein the rotor unit includes two ball bearings and a housing, wherein each of the two ball bearings includes an inner race and an outer race, wherein the inner race of each of the two ball bearings is mounted to a respective one of the two engaging portions, wherein the housing is coupled to the outer races of the two ball bearings, wherein the stator unit is enclosed in the housing, and wherein a magnetic member is mounted to the housing and is aligned with the stator unit for magnetic induction,
wherein the buffering member is located between one of the two engaging portions of the sleeve and the inner race of one of the two ball bearings.

7. The ceiling fan motor as claimed in claim 6, wherein the buffering member is press fit around the outer periphery of the sleeve.

8. The ceiling fan motor as claimed in claim 6, further comprising a restraining cover located between the buffering member and one of the two engaging portions of the sleeve, wherein the buffering member abuts the restraining cover, and wherein the restraining cover includes a sidewall facing an outer periphery of the buffering member.

9. A ceiling fan motor comprising:
a sleeve;
a stator unit fixed around the sleeve;
a rotor unit rotatably mounted around the sleeve; and
an axle detachably mounted to the sleeve,
wherein the sleeve includes an inner periphery and an outer periphery, wherein the outer periphery includes a stator coupling portion and a rotor coupling portion, wherein the stator unit is fixed to the stator coupling portion, and wherein the rotor unit is rotatably mounted to the rotor coupling portion,
wherein the sleeve includes a wire extending portion extending from the inner periphery through the outer periphery of the sleeve,
wherein the wire extending portion includes a groove and two through-holes spaced from each other, wherein the groove is defined in the inner periphery of the sleeve and does not extend to the outer periphery of the sleeve, and wherein each of the two through-holes extends from the outer periphery of the sleeve to the groove.

10. The ceiling fan motor as claimed in claim 9, wherein the rotor coupling portion includes two engaging portions, and wherein the stator coupling portion is located between the two engaging portions.

11. The ceiling fan motor as claimed in claim 10, wherein the rotor unit includes two ball bearings and a housing, wherein each of the two ball bearings includes an inner race and an outer race, wherein the inner race of each of the two ball bearings is mounted to a respective one of the two engaging portions, wherein the housing is coupled to the outer races of the two ball bearings, wherein the stator unit is enclosed in the housing, and wherein a magnetic member is mounted to the housing and is aligned with the stator unit for magnetic induction.

12. The ceiling fan motor as claimed in claim 11, wherein the housing includes an annular wall, wherein the magnetic member is mounted to the annular wall, wherein the annular wall has an axial height along a longitudinal axis of the sleeve, and wherein the sleeve has an axial length along the longitudinal axis larger than the axial height of the annular wall.

* * * * *